United States Patent [19]

Lau

[11] Patent Number: 4,617,995

[45] Date of Patent: Oct. 21, 1986

[54] DUAL GRADIENT STEAM FOAM OIL DISPLACEMENT PROCESS

[75] Inventor: Hon Chung Lau, Houston, Tex.

[73] Assignee: Shell Oil Company, Houston, Tex.

[21] Appl. No.: 768,010

[22] Filed: Aug. 22, 1985

[51] Int. Cl.$^4$ .................. E21B 43/24; E21B 43/22
[52] U.S. Cl. ............................ 166/272; 166/274; 166/303
[58] Field of Search ............. 166/272, 273, 274, 303, 166/304

[56] References Cited

U.S. PATENT DOCUMENTS

| | | | |
|---|---|---|---|
| 3,087,539 | 4/1963 | Mauru | 166/274 |
| 4,074,755 | 2/1978 | Hill et al. | 166/273 X |
| 4,393,937 | 7/1983 | Dilgren et al. | 166/272 |
| 4,532,993 | 8/1985 | Dilgren et al. | 166/303 |

Primary Examiner—Stephen J. Novosad
Assistant Examiner—Thomas J. Odar

[57] ABSTRACT

Oil is produced from an ion-exchanging reservoir by a dual gradient-establishing injection of a relatively short and concentrated slug of hot aqueous fluid containing surfactant and monovalent salt, followed by a steam-foaming mixture in which stem is mixed with much less of each of the surfactant and salt.

8 Claims, 2 Drawing Figures

DUAL GRADIENT STEAM FOAM OIL DISPLACEMENT PROCESS

RELATED APPLICATIONS

Application Ser. No. 705,773 filed Feb. 26, 1985 by R. E. Dilgren, H. C. Lau and G. J. Hirasaki, on a reservoir preflushing process for increasing the rate of surfactant transport in displacing oil with injected steam and steam-foaming surfactant, describes injecting an aqueous liquid solution of surfactant and monovalent salt before injecting at least some steam and steam-foaming surfactant.

Application Ser. No. 712,931 filed Mar. 18, 1985 by R. E. Dilgren and K. B. Owens on steam-foaming surfactant mixtures which are tolerant of divalent ions, describes a mixture of steam and steam-foaming surfactant in which an independently effective steam-foaming sulfonate surfactant is mixed with a smaller amount of an alkyl or alkylarylpolyalkoxyalkane sulfonate cosurfactant.

The above patent applications are commonly assigned and their disclosures are incorporated herein by reference.

BACKGROUND OF THE INVENTION

The present invention relates to displacing oil within a subterranean reservoir by injecting steam and steam-foaming surfactant. More particularly, the invention relates to injecting a pretreating fluid ahead of at least some of the steam and steam-foaming surfactant, for increasing the rate of surfactant transport and decreasing the amount of surfactant needed.

Numerous processes have been developed for displacing oil within a subterranean reservoir by injecting mixtures of steam and steam-foaming surfactants. For example, U.S. Pat. No. 4,086,964 R. E. Dilgren, G. J. Hirasaki, D. G. Whitten and H. J. Hill describes such a process for steaming a reservoir susceptible to gravity override until a steam breakthrough from injection to production wells is at least imminent then injecting a steam-foam-forming mixture of steam, noncondensible gas, aqueous electrolyte and steam-foaming surfactant, to maintain an increased pressure within the steam channel without plugging or fracturing the reservoir. U.S. Pat. No. 4,393,937 by R. E. Dilgren and K. B. Owens describes a process for displacing oil within a subterranean reservoir by injecting a steam-foam-forming composition comprising steam, noncondensible gas, aqueous electrolyte and olefin sulfonate surfactant. The disclosures of those patents are incorporated herein by reference.

SUMMARY OF THE INVENTION

The present invention relates to improving an oil recovery process in which oil is displaced within a reservoir in which multivalent cations are ion-exchanged by injecting aqueous pretreatment fluid followed by a mixture of steam and steam-foaming surfactant. The improvement comprises a combination of steps: (1) at least one slug of pretreatment fluid is injected to provide a total volume which is not significantly more than the volume of pore space traversed by fluid flowing between the injection location and the location into which oil is to be displaced within the reservoir; (2) the total volume of injected pretreatment fluid contains both (a) enough monovalent cations to ion-exchange with at least most multivalent cations on the rocks which are contacted, and (b) enough steam-foaming surfactant to substantially satisfy the surfactant-retaining properties of the rocks which are contacted; and (3) the pretreatment fluid is followed by a mixture of steam, steam-foaming surfactant and aqueous electrolyte in which the proportions of the surfactant and electrolyte are significantly lower than the proportions of those substances in the pretreatment fluid, so that a gradient of decreasing concentration is formed in respect to both the injected proportions of steam-foaming surfactant and electrolyte.

DESCRIPTION OF THE INVENTION

Figure 1:
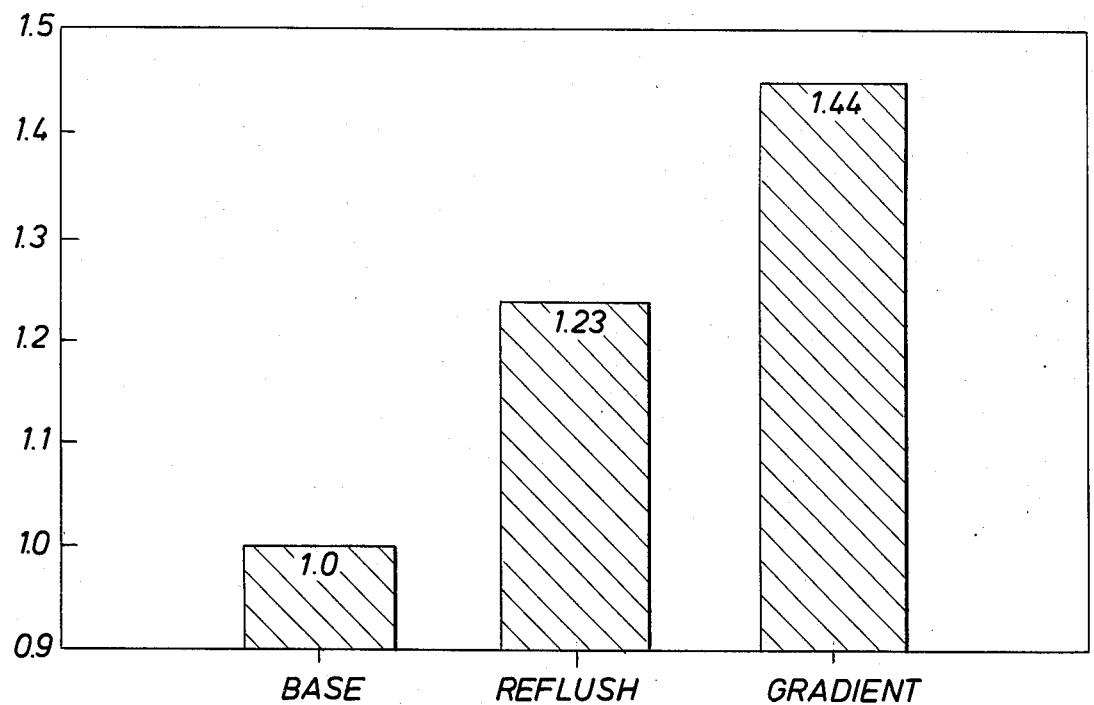
FIGS. 1 and 2 show plots of surfactant propagation rates and surfactant requirements, respectively, for flows of hot aqueous fluids through sandpacks of reservoir sands.

In a process for displacing oil within a subterranean reservoir by injecting a mixture of steam and steam-foaming surfactant, an efficient transport of the surfactant through the reservoir is important. This is important because the rate at which foam moves through the reservoir cannot exceed the rate at which the surfactant is transported.

Many subterranean reservoir rocks have an ion-exchange capacity and multivalent cation content sufficient to impede the transport of a steam-foaming surfactant through the reservoir. Such an impeding is due to a mechanism by which monovalent cations in an injected surfactant solution (such as the aqueous phase of a mixture of steam and steam-foaming surfactant) displace multivalent cations from the clays and the like ion-exchange sites on the reservoir rocks. This exchange results in a buildup of the multivalent cation content in the injected surfactant solution.

Of all the mechanisms affecting the surfactant transport in a steam foam process, ion exchange is one of the most critical mechanisms. Other mechanisms such as partitioning and precipitating, are directly related to the multivalent cation concentration of the aqueous liquid phase.

In the presence of oil, a buildup of multivalent ions (such as a calcium ion buildup due to ion exchange) increases the partitioning of the surfactant into the oleic phase. This is due to normal surfactant micelles in the aqueous phase being converted to inverse micelles in the oleic phase. The surfactant transport is thus retarded due to the partitioning of surfactant into trapped oil.

In general, the present process is applicable to substantially any reservoir situation in which oil is to be displaced by injecting steam and steam-foaming surfactant and the transport of that surfactant is significantly impeded by ion-exchange with the reservoir rock. The occurrence of such an impeding of the surfactant transport can, of course, be determined in numerous known ways such as those based on logging measurements, core measurements, and the like. In addition, it can readily be detected by monitoring the concentration with time with which a steam-foaming surfactant is transported through a reservoir and into a monitoring or producing location. The present process is particularly useful in reservoirs which are susceptible to a gravity override and the path followed by injected steam is not confined to one or more relatively thin layers of high absolute permeability.

In the application Ser. No. 705,773, it was indicated that in reservoirs in which a steam-foam displacement of oil is impeded by the ion-exchange capacity of the reservoir rocks, the rate of propagation of a wave of ion-exchange-induced multivalent cation concentration within an injected liquid increases with increases in the initial monovalent ion concentration of that liquid. The extent of that increase is such that, by injecting an aqueous preflush solution, having a monovalent cation concentration which is effective for initiating an ion exchange, a significant increase can be provided in the rate at which a steam-foaming surfactant is subsequently propagated through the reservoir. In such a preflush solution the monovalent cation concentration preferably exceeds that of the mixture of steam and steam-foaming surfactant which is to be injected after the preflush solution. Such a procedure provides a decreasing concentration gradient regarding the electrolyte.

I have now discovered that the process of the application Ser. No. 705,773 can be significantly improved by arranging the size and composition of a pretreatment fluid for further reducing the surfactant retarding effect of reservoir rocks which have been or are being treated so that most of the ion-exchange sites are occupied by monovalent cations. The addition of surfactant concentration gradient is important. In chemically aided processes for displacing oil into production locations within a subterranean reservoir, chemical costs are critical. When the cost of producing the oil approaches the market value of the oil, the process, in effect, becomes inoperable.

My research has shown that, both the extent of surfactant retardation on the rocks and the amount of surfactant needed to recover a given proportion of oil can be significantly reduced by including a relatively large proportion of surfactant in a relatively small slug of pretreatment fluid injected ahead of a relatively large volume of relatively dilute steam foam.

In the process of the application Ser. No. 705,773, when a surfactant is included in the present type preflush solution, the main function of the included surfactant is to improve the distribution of the preflush solution. Such an improved distribution is caused by (1) generation of foam which improves the injection profile and vertical sweep of preflush solution and/or (2) the transport of preflush solution upward into the steam zone by moving liquid lamellae in a substantially homogeneous mixture of steam and liquid. In contrast, in the present process, such a distribution effect is inherent, while the main function of the relatively large proportion of surfactant is a relatively quick satisfying of the adsorption sites, or possibly other causes for a retardation of surfactant transport through the pores of the rocks which have been or are being contacted by the pretreatment solution so that most, if not all, of the multivalent cations are exchanged for monovalent cations.

In the present process, the total volume of injected pretreatment fluid should not be significantly more than the pore volume of the reservoir rocks traversed by fluid flowing between the injection location and the location into which oil is to be displaced within the reservoir. Such a volume should be about 0.05 to 1.0 times that pore volume. The concentration of the monovalent cation in the pretreatment fluid should be high enough to cause an ion-exchange with at least most of the multivalent cations on the portion of reservoir rocks contacted by the pretreatment fluid. Such a concentration should be about 1.0 weight percent to a saturation value, while being sufficient to exchange monovalent cations for multivalent cations on most, if not all of the exchange sites on the reservoir rocks that are contacted by the pretreatment fluid. The concentration of the surfactant in the pretreatment fluid should be high enough to substantially satisfy whatever surfactant-retaining effects are exhibited by reservoir rocks which have received an ion-exchanging contact by the pretreatment fluid. Such a concentration of surfactant is characterized by a capability of causing a pretreatment solution containing it to exhibit rapid surfactant transport in laboratory tests. Such tests can be conducted by flooding a sandpack of reservoir rocks having a concentration of ion-exchangable multivalent cations equivalent to the initial concentration of such cations on the reservoir rocks.

In the present oil recovery process, the injected pretreatment fluid and reservoir oil should be displaced toward a production or other location by an injection of steam-foaming fluid containing steam, steam-foaming surfactant and electrolyte, and preferably, noncondensable gas. In a steam drive process such a steam-foaming fluid injection should be substantially continuous, for displacing oil into a production location. In a steam soak process such a steam-foaming fluid injection should be continued for causing a selected extent of steam penetration into the reservoir then terminated, with fluid being subsequently backflowed to initiate a steam-foam displacement of oil into a location which was initially an injection location.

Monovalent cation salts, suitable for use in the present pretreatment fluids, can comprise substantially any alkali metal or ammonium salts containing anions such as chloride, nitrate, and the like as long as such anions are compatible with the anions of the other pretreatment fluid components, or those in fluids in the reservoir. Sodium chloride is particularly suitable for such use.

Surfactants suitable for use in the present pretreatment fluid, or preflush solution, preferably comprise surfactants having a good stability at steam temperature and a steam-foaming capability of significantly reducing the mobility of steam. Their composition can be the same or different from the surfactants used in the steam-foaming fluid injected following the pretreatment. The concentration of surfactant in the pretreatment fluid should be at least about one and one-half times more than the concentration to be used in the steam-foaming mixture of steam and surfactant to be injected later. Where needed, or desired, the preflush solution can be heated to a temperature at least substantially equalling that at which the mixture of steam and steam-foaming surfactant is to be injected and mixed with enough steam and/or noncondensible gas to form a foam or substantially homogeneous mixture of steam and preflush solution within the reservoir. The pretreatment fluid can advantageously be injected as a fluid co-flowing with a stream of steam, which steam will, when the pretreatment fluid injection is completed, continue to be injected as steam mixed with relatively smaller proportions of steam-foaming surfactant.

Steam-foaming surfactants suitable for use in either the pretreatment or steam-foaming fluid of the present process can comprise substantially any individual compounds or mixtures which are effective for foaming steam. As known in the art, some surfactants effective for foaming a gas such as steam are also effective for interfacial tension lowering, while other surfactants are effective for only one or the other of such functions. Examples of suitable steam-foaming surfactants include substantially any which are capable of providing a relatively low steam mobility factor, as described in the cross-referenced U.S. Pat. Nos. 4,086,964 and 4,393,937. The surfactants such as the dodecylbenzenesulfonate surfactants and olefin sulfonate surfactants are particularly suitable.

In a preferred procedure, the reservoir is initially steamed with a wet, dry or superheated steam, to increase the temperature of the reservoir while producing oil, either in a substantially continuous drive or a cyclic soak type process. In view of the relatively high mobility of steam, the rate of oil production is reduced by a steam breakthrough into a production location, such as breakthrough into an adjoining production well, or by a formation of substantially steam-filled oil-depleted zone in an upper part of the reservoir adjoining a steam soak well. The present pretreatment fluid is preferably injected at this time in a volume sufficient to remain as an intact slug while being displaced through at least a substantial portion of the zone which is traversed by fluid flowing from the injection to the production locations, and which is, or is soon apt to be, filled with steam. The pretreatment fluid is preferably heated to at least near the reservoir temperature prior to its injection. It is preferably injected in a volume amounting to about 0.05 to 1.0 times the pore volume of the portion of the reservoir through which the oil is to be displaced. The pretreatment fluid can be injected in one or a plurality of slugs, each of which can contain different kinds and amounts of surfactants and electrolytes, as long as the totals of the volumes and amounts are those indicated herein. In general, the use of two slugs is preferred; the first slug with high surfactant and high electrolyte concentrations, the second slug with high surfactant but lower electrolyte concentrations. In situations where both the divalent ion content and surfactant adsorption of the reservoir rocks are very high, a single relatively concentrated slug may be preferred.

The injected mixture of steam and steam-foaming surfactant can be mixed at a surface location and, with or without prefoaming, can be injected simultaneously or alternately injected in small enough slugs to become substantially homogeneously mixed within a well or soon after entering the pores of the reservoir formation. The mixture of steam and steam-foaming surfactant preferably also contains effective proportions of non-condensible gas and/or dissolved electrolyte. In general, the types and proportions of such components are preferably substantially like those discussed in more detail in the cross-referenced U.S. Pat. Nos. 4,086,964 and 4,393,937.

A set of ten corefloods was run to study the surfactant propagation rate and surfactant requirement of various designs. The results are summarized by the following three representative corefloods itemized in Table 1.

TABLE 1

INJECTED FLUIDS AND THEIR COMPOSITIONS FOR DIFFERENT DESIGNS

Base Case
1. Continuous injection of 4 wt % NaCl and 0.5 wt % Enordet ® AOS 1618 (an alpha-Olefin sulfonate surfactant available from Shell Chemical Company)

Preflush
1. 0.2 PV of 10 wt % NaCl.
2. Continuous injection of 1.0 wt % NaCl and 0.5% Enordet ® AOS 1618.

Gradient
1. 0.1 PV 13% NaCl, 2.0% Enordet ® AOS 1618.
2. 0.1 PV 1% NaCl, 2.0% Enordet ® AOS 1618.
3. Continuous injection of 1.0% NaCl, 0.1% Enordet ® AOS 1618.

Each coreflood was conducted at 212° F. with Bay Marchand sand, which has ion-exchange properties similar to those of Kern River sand with respect to the way they impede the transport of a steam-foaming surfactant. At the beginning of each experiment the sandpack was saturated with Bishop crude oil at waterflood residual oil saturation (Oil saturation was about 25 percent; water saturation was about 75 percent.) Synthetic Kern River connate water was used. The electrolyte composition of that water was $Cl^- = 0.02$ meq/ml
$Ca^{++} = 0.0032$ meq/ml
$Na^+ = 0.0168$ meq/ml In contact with water of that composition, about 86 percent of the clays are in calcium form. The experiments began with injection of aqueous solutions with compositions given by Table 1. Effluent liquids were collected in small fractions and titrated for calcium, chloride, and surfactant.

Such corefloods have been found to be indicative of field operations using steam of about 30 to 50 percent quality mixed with equivalent surfactants and electrolytes.

In Table 1, note that the preflush in the Gradient Design coreflood contained surfactant whereas that in the Preflush Design coreflood did not. In the preflush process of application Ser. No. 705,773, when a surfactant is used the purpose and amount of surfactant during the preflush is to form a foam to transport the saline water up to the steam zone.

Figure 2:
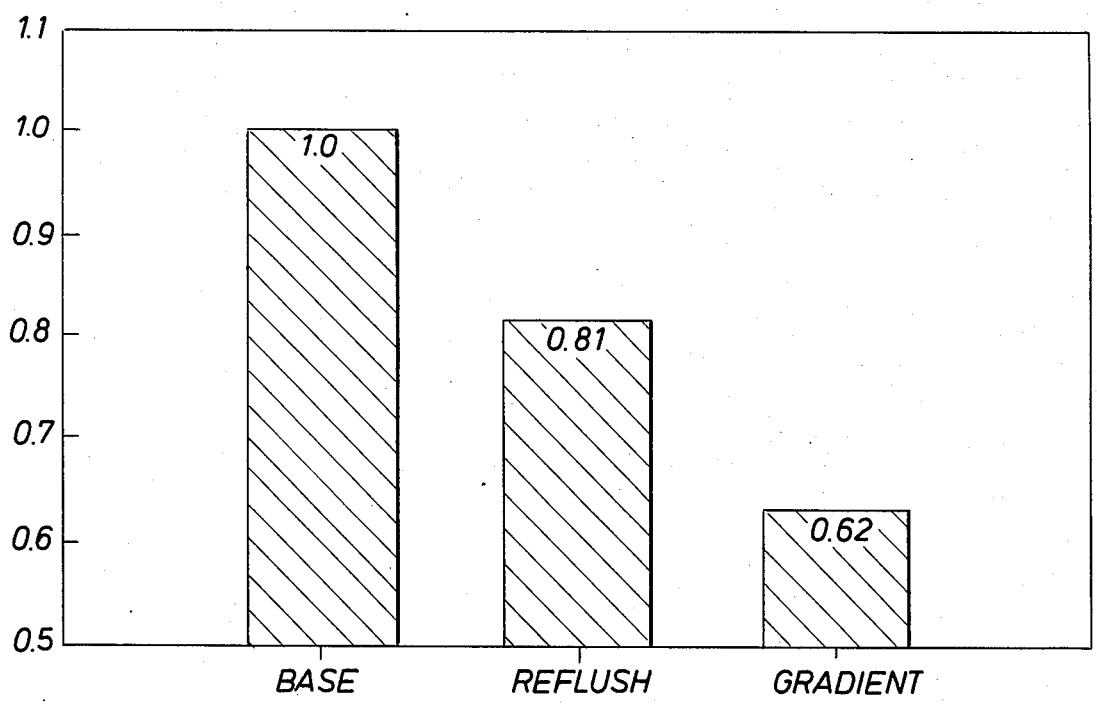

FIGS. 1 and 2 provide a comparison of the surfactant "Propagation Rates" and "Surfactant Requirements" for the three different corefloods. The Surfactant Propagation Rate is defined as the reciprocal of the breakthrough time of the midpoint injected concentration. The Surfactant Requirement is defined as the total amount of surfactant injected up to the time of that breakthrough. All results are normalized with respect to those of the "4 wt % NaCl" Base Case.

It can be seen that the "Preflush" Design increased the surfactant propagation rate by 23% (FIG. 1) and reduced the surfactant requirement by 19% (FIG. 2). The corresponding numbers for the "Gradient" Design were 44% and 38%.

Results of the "Gradient" Design coreflood show that increasing the initial injected surfactant concentration from 0.5 to 2.0 wt % caused a significantly increased rate of surfactant transport. And, the reduction in the injected surfactant concentration during the continuous injection phase (after adsorption was satisfied) significantly reduced the total amount of surfactant that was injected.

What is claimed is:

1. In an oil displacement process in which oil is displaced by injecting pretreatment fluid, steam and steam-foaming surfactant into a reservoir in which surfactant transport is impeded by an ion-exchange of multivalent cations from the rocks, an improvement comprising:

injecting said pretreatment fluid in a volume totalling not more than about the volume of the pore space to be traversed in flowing from the injection location to the location within the reservoir into which the oil is to be displaced;

arranging the composition of said pretreatment fluid in correlations with the properties of the reservoir rocks so that the injected volume of the pretreatment fluid contains both (a) sufficient monovalent cations to ion-exchange with at least most of the multivalent cations on the reservoir rocks contacted by that fluid, and (b) enough steam-foaming surfactant to substantially satisfy the surfactant transport-impeding effects of the rocks contacted by the pretreatment fluid; and injecting steam-foaming fluid, comprising steam, steam-foaming surfactant, and monovalent electrolyte, in which the proportions of the surfactant and electrolyte are each less than about half of those contained in the pretreatment fluid.

2. The process of claim 1 in which the oil recovery process is a steam-foam-drive process.

3. The process of claim 1 in which the oil recovery process is a steam-foam-soak process.

4. The process of claim 1 in which the steam-foaming surfactant consists essentially of olefin-sulfonate surfactant.

5. The process of claim 1 in which enough steam, steam-foaming surfactant, and monovalent electrolyte to cause a significant increase in the injection pressure and temperature required for injecting steam into the reservoir, is injected prior to injecting the pretreatment solution.

6. The process of claim 1 in which the pretreatment fluid is injected subsequent to an injection of steam but prior to an injection of at least a portion of a steam-foaming mixture of steam, steam-foaming surfactant and monovalent electrolyte.

7. The process of claim 1 in which the pretreatment fluid contains about 1 to 20 wt % monovalent electrolyte, about 0.5 to 5% steam-foaming surfactant, and has a volume of about 0.05 to 1.0 of the reservoir pore volume traversed by fluid flowing from the injection to production locations within the reservoir.

8. The process of claim 7 in which the pretreatment fluid is injected as a plurality of slugs which provide the respective total amounts of pretreatment fluid, monovalent electrolyte and steam-foaming surfactant.

* * * * *